O. B. CAMPBELL, Jr.
ROTARY CONICAL VALVE FOR INTERNAL COMBUSTION MOTORS.
APPLICATION FILED MAR. 26, 1912.

1,139,953. Patented May 18, 1915.

WITNESSES
A. B. Cornelius
Marie Mitchell

INVENTOR
Osmon B. Campbell Jr.
BY Eugene Ayres,
ATTORNEY

UNITED STATES PATENT OFFICE.

OSMON B. CAMPBELL, JR., OF KANSAS CITY, MISSOURI.

ROTARY CONICAL VALVE FOR INTERNAL-COMBUSTION MOTORS.

1,139,953.  Specification of Letters Patent.  Patented May 18, 1915.

Application filed March 26, 1912. Serial No. 686,228.

*To all whom it may concern:*

Be it known that I, OSMON B. CAMPBELL, Jr., a citizen of the United States of America, residing at 3508 Baltimore avenue, Kansas City, in the county of Jackson and State of Missouri, have invented certain new and useful Improvements in Rotary Conical Valves for Internal-Combustion Motors, of which the following is a specification.

If a cone shaped valve is not provided with self adjusting means, it may be made to fit "gas tight" when cold, but when it becomes warm it will bind or stick in its housing. Or, if provision is made for the expansion of the valve, so that the fit will be perfectly gas tight when warm and yet not stick, the valve must be made to fit loosely in the housing when cold: thus the valve will not be "gas tight" when cold.

The object of my invention is to provide a valve for an internal combustion motor that will be gas tight both when hot and when cold and which will not bind or stick in the housing when it expands as a result of becoming heated.

I accomplish my object by the mechanism illustrated in the accompanying drawings, in which,—

Figure 2:
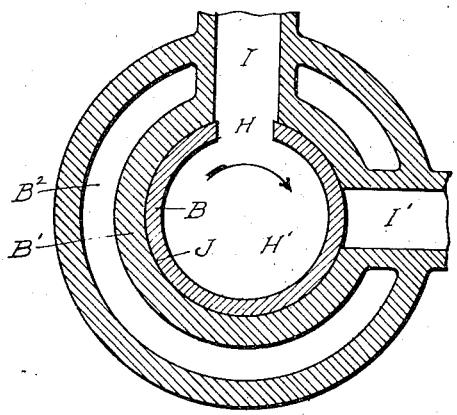
Figure 1:
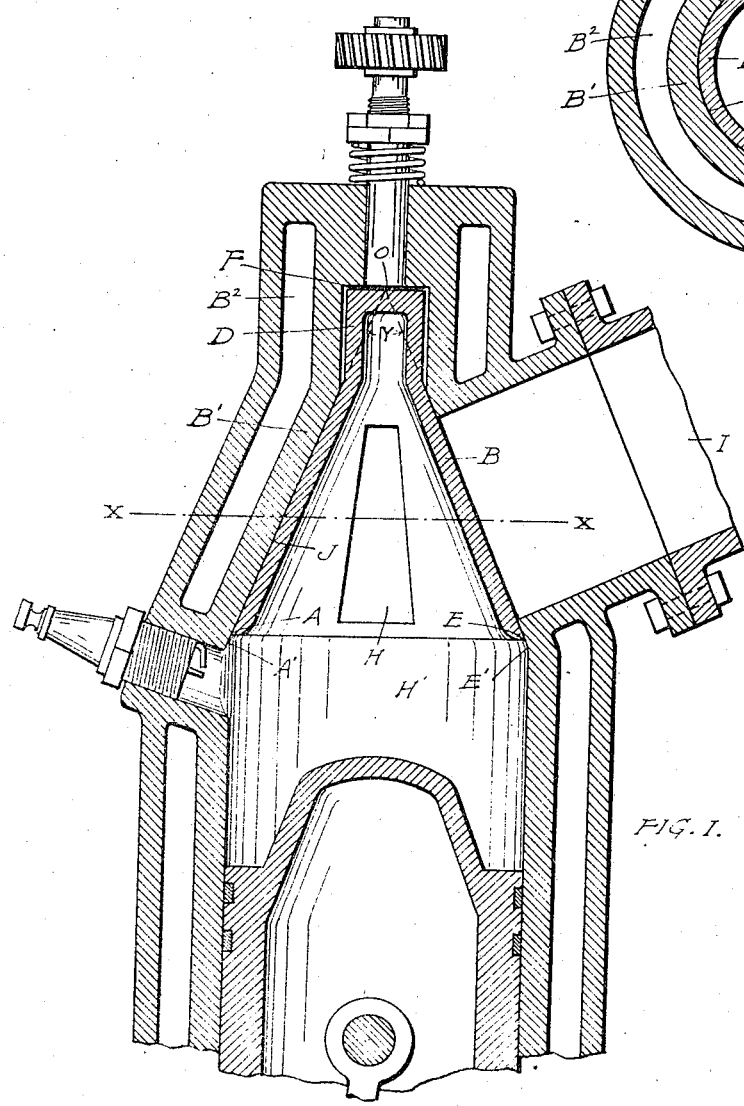

Figure 1 is a sectional elevation of my rotary conical valve and Fig. 2 is a cross section of the same cut on line $x$—$x$ of Fig. 1.

Similar letters of reference indicate corresponding parts in said drawings and in these specifications.

The valve consists of two parts: a rotating male member B and a housing female member B'. These are inclosed in a water jacket B². Said rotating member consists of a hollow cone shaped chamber having a cylindrical portion D extending from the apex end of said cone, a thrust bearing F and port H in the wall of the cone for admitting and discharging gas into and from the clearance space or combustion chamber H'. The inside of housing B' conforms in shape to the shape of the outside of said rotating member and is provided with ports I I' which register with the port in said rotating member.

In Fig. 2 I show, approximately, the position of the ports in the valve. Port H in the rotating member registers alternately with exhaust and intake ports I and I' in the housing. The space from the center of said exhaust port to the center of the intake port is, approximately, equal to one-fourth of the circumference of the cone. Said port H in the rotating member has four sides; one is narrower than the other four sides; and the port is much longer than it is wide. The rotating member is placed within the clearance space of an internal combustion motor the upper portion of the engine cylinder thus forming the housing for said rotating member the axis of the cone lying with the axis of the engine cylinder. Said thrust bearing F must be at the point in a plane with the point O at which said apex of the cone would fall if the cone were extended as shown by dotted lines in Fig. 1, instead of being merged with the cylindrical portion.

The valve is adapted to rotate at one-half the crank shaft speed and by the self adjusting properties possessed by said valve a gas tight fit between the valve and its seat J is obtained at all temperatures: this adjustability is based on the physical law that different lengths of like substances expand the same proportion of their respective lengths for equal rises in temperature, and on the mathematical law: extend all sides of a triangle the same proportion of their respective lengths and a larger but similar triangle results. In my drawing consider for the moment the conical portion and the dotted apex to be a plain triangle—A O E. Point O is fixed; extend all sides the same proportion of their respective lengths and a larger but similar triangle results: therefore the angle Y does not change. The extended triangle may be considered to be O A' E' and as the angle Y has not been changed and the point O is fixed, the sides O E' and O A' lie along the housing, as before the extension. The lateral expansion of the valve has been offset by the longitudinal extension of the valve away from the point O, and in the case of the valve in practice, the lateral expansion of the heated cone has been offset by the longitudinal expansion and extension in the direction away from the thrust bearing, which is at point O, and the valve is prevented from binding in its housing.

What I claim and desire to secure by Letters Patent is,—

1. The combination in a rotary conical valve for internal combustion motors comprising a cone shaped portion expanding toward the engine cylinder, a cylindrical portion of the valve, the small end of said cone merging into said cylindrical portion of the valve, a shaft carried at the center by said cylindrical portion of said valve and a flat thrust bearing on said cylindrical portion at the opposite end from the cone.

2. The combination in a rotary conical valve for internal combustion motors comprising a hollow cone shaped member open at the large end, a port in said cone shaped member to register with ports in the housing of said member and a shaft for driving said cone shaped member, of a cylindrical portion forming an intermediate portion between said cone shaped member and said driving shaft and a thrust bearing provided at the end of the cylindrical member opposite the end which merges with said cone shaped member.

In testimony whereof I affix my signature in presence of two witnesses.

OSMON B. CAMPBELL, Jr.

Witnesses:
   ORVAL J. CUNNINGHAM,
   HARRAL W. COULTER.